United States Patent Office 3,350,245
Patented Oct. 31, 1967

3,350,245
COMPOSITE POLYETHER PROPELLANTS
Lionel Arthur Dickinson, Quebec, Quebec, Canada, assignor to Her Majesty the Queen in the Right of Canada as represented by the Minister of National Defence, Ottawa, Ontario, Canada
No Drawing. Filed Mar. 3, 1960, Ser. No. 12,647
Claims priority, application Canada, Sept. 9, 1959, 782,107
13 Claims. (Cl. 149—19)

This invention relates to composite rocket propellants and in particular to an improved propellant composition employing an elastomeric binder.

The present aim in propellant development is to obtain propellants with a high specific impulse which are nevertheless easily handled, capable of reliable performance and possess physical properties which can be readily reproduced without unduly complicated control of manufacture. Solid fuels are generally considered the most easily handled form of propellant and are therefore preferred for many applications.

There are at present two main types of solid propellant, these being the double base and the composite types. The former has been used to some extent in rocket engines but serious difficulties have been found with this type of propellant at low temperatures due to the relatively high brittle point of the composition. On the other hand the composite type of propellant is normally based on an inorganic oxidant together with an elastomeric binder, and this type of composition is capable of being cast and subsequently cured into large integral rocket grains, generally bonded to the casing of the rocket motor. The grain geometry which governs the change in exposed grain surface area with the amount of propellant burnt, is predetermined at the time of manufacture and it is therefore essential for reliable operation of the rocket that the burning of the propellant be closely reproducible. Considerable research has been directed to making such propellants more reproducible in properties and in particular towards improving the elastic properties of the propellant with a view to increasing the reliability of the rocket engines at extremes in temperature.

Based on present knowledge it can be stated that binders suitable for use in composite propellants should be fluid enough to permit casting, have adequate stress-strain properties when compounded with relatively course additional ingredients such as the oxidant, and have adequate fuel value. Binders of an elastomeric nature have been found to be most suitable since in these binders thermal stresses relieve themselves. In view of the nature of the fuel the binder should obviously be capable of curing without the generation of excessive heat and in order to satisfy the requirements referred to above it should have a low brittle point when cured and should not be prone to cold hardening.

It is already known that elastomers of the general type suitable for binders may be produced by reacting diols with diisocyanates and including a cross-linking agent in order to build up a three-dimensional polymeric network. Such diols have been low molecular weight diols such as ethylene glycol or high molecular weight doils such as polyalkylene ether diols. The diisocyanate has been either aromatic or aliphatic in nature and the cross-linking agent has been a polyfunctional molecule such as a triol or other polyhydroxy compound. Thus, one type of elastomer utilizes a polyalkylene ether diol chain extended by means of a diisocyanate and cross-linked by the use of an elementary (low molecular weight) triol such as 1,2,6-hexanetriol. Typical diols for the above type of composition have been of relatively high molecular weight, sometimes as high as 3500 or more, while typical cross-linking agents have had a molecular weight of less than 200. However, the elastic properties of such compositions have been found to be inadequate for the formulation of composite fuels and investigations showed that these deficiencies probably arose from the differing reactivity of the active groups of the diols and triols used, from the frequent nonmiscibility of the diols and triols, and from difficulties attributable from the close proximity of the bulky diisocyanate groups on the cross-linking triol. The lack of miscibility between the low molecular weight elementary triol and the high molecular weight polyalkylene ether diol also gave rise to difficulties in the actual preparation of a castable elastomer.

The present invention seeks to minimize or avoid the above mentioned difficulties by providing a suitable choice of base propolymer materials which, used in conjunction with inorganic oxidants and preferably with plasticizers and other additives, is capable of being cast into a composite propellant having properties substantially meeting the above mentioned requirements.

According to the present invention the composite propellant employs as a binder an elastomer comprising a polyalkylene ether diol which has been chain extended by an organic diisocyanate and which has been cross-linked by a triol which is compatible by virtue of its molecular weight being comparable to that of the diol.

Suitable polyalkylene ether diols for use in this invention have a molecular weight in the range of about 1500 to about 3000, and include polyethylene ether diols, polypropylene ether diols and copolymers of tetrahydrofuran with alkylene oxides such as propylene oxide. The diol must be substantially free from peroxides and carbonyl groups, which impurities are sometimes found in commericial materials, having arisen in the course of preparation. The most satisfactory binders have been produced with diols having a saponification number of not more than 0.3 (milligram KOH per gram) and having a peroxide content of less than 0.001 milli-equivalent per gram. To maintain the physical properties of the binder it is necessary to use a polymer backbone which is capable of crystallizing but which is not of such a nature that the viscosity of the diol used is too high to prevent fabrication of the rocket grain by casting. It is for this reason that the preferred diols are block copolymers of a polytetrahydrofuran base, e.g. a tetrahydrofuran-propylene oxide copolymer, having a molecular weight within the above-defined limits. It is also possible to obtain an improved elastomer by blending polytetrahydrofuran, suitably of molecular weight about 1000, with polypropylene ether diol.

The diisocyanates which may be employed according to the present invention include both aromatic and aliphatic diisocyanates, particularly diisocyanates having about 6 or more carbon atoms apart from those in the isocyanate groups, such as for example 2,4- and 2,6-tolylene diisocyanates, diphenylmethane diisocyanate and hexamethylene diisocyanate. The chain extension of polyalkylene ether diols is of course known and in general those diisocyanates known to be useful for this purpose may be employed according to the present invention. In practice the diisocyanate is chosen for its fluidity at ambient or mixing temperatures and for its ready availability.

The triols used as the third component of the elastomer should have a molecular weight in the range of about 500 to about 3000 and preferably between 1000 and 2400. Such triols may be prepared by reacting an alkylene oxide with an elementary triol of low molecular weight or with an elementary aminoalcohol. Triols and aminoalcohols of molecular weight up to about 200 may be employed. High molecular weight triols of different structure are not normally readily available and hence are not of major interest for the present compositions. As elementary triols suitable for making the high molecular weight triol adducts used as crosslinking agents there may be employed such substances as glycerol, trimethylolethane, trimethylolpropane, and 1,2,6-hexanetriol. Alternatively the elementary triol may be replaced by an aminoalcohol such as an ethanolamine, propanolamine, etc. The preferred type of cross-linking agent for use in the composition of this invention is an alkylene oxide adduct, particularly a propylene oxide adduct, of 1,2,6-hexanetriol. The closer the molecular weight of the triol adduct to the polyalkylene ether diol, the greater the compatibility and hence the more satisfactory the composition. The triol adducts referred to above may be prepared by direct reaction of the chosen alkylene oxide with the elementary triol or aminoalcohol in the presence of an alkali metal oxide such as $Na_2O$ or $Li_2O$ as catalyst.

The elastomeric binders may be prepared from the above starting materials by various methods. For instance the polyalkylene ether diol, the cross-linking triol and the diisocyanate can be brought together into a single reaction mixture to which may be added a separate urethane polymerization catalyst and a plasticizer, the oxidant, and other ingredients, and the polymerization allowed to take place, usually being completed in the site where it is desired, i.e. in the actual rocket engine. Normally the reactants are prepolymerized to some extent and the plasticizer, oxidant and other ingredients then blended into the mixture whereupon the blended propellant is filled into the rocket casing and finally polymerization or curing carried out at an elevated temperature of e.g. 45–70° C. A better method of preparing the binder is to react the polyalkylene ether diol and the diisocyanate first and then to cross-link with the triol, the procedure being otherwise as described above. However the preferred method which gives the lowest viscosity mixes is to prereact the high molecular weight triol with the diisocyanate and then to react the propolymer so produced with the polyalkylene ether diol. Typically, in the preferred method, an alkylene oxide adduct of 1,2,6-hexanetriol of molecular weight about 1500 is prereacted with the diisocyanate in the presence of a plasticizer to form an isocyanate-rich prepolymer. A urethane polymerization catalyst such as ferric acetyl acetonate at a level of about 0.03 to 0.06% by weight is then blended into a polyalkylene ether diol of molecular weight of about 2000 together with an antioxidant such as phenyl-$\beta$-naphthylamine. The oxidant such as ammonium perchlorate is then thoroughly blended with the diol followed by the the addition of the triol-isocyanate prepolymer. After thorough blending the mix is then cast under vacuum into the rocket engine and cured as described above.

The properties of the elastomer may of course be varied somewhat by altering the relative proportions of the components. The amount of diisocyanate used is up to about 10% in excess of the amount theoretically required for reaction with the total hydroxyl content of the polyalkylene ether diol and the triol adduct used as cross-linking agent. The preferred amount of diisocyanate is equivalent to a 3–7% stoichiometrical excess. The preferred diol to triol adduct weight ratio is in the range 3:1 to 8:1.

Of the remaining ingredients of the propellants according to this invention, the oxidant is present in the greatest amount. In general the amount of the oxidant is such as to constitute between about 70 and 90% by weight of the finished propellant. Suitable oxidants are for instance inorganic oxygen-rich salts such as nitrates and the perchlorates. Particularly useful oxidants are ammonium perchlorate and lithium perchlorate. The former however cannot be used where the elastomer is made by the use of an amino-alcohol-alkylene oxide adduct as the cross-linking agent since the basicity of the resulting elastomer would render the ammonium perchlorate unstable.

For modifying the physical properties of the propellant, particularly at low temperatures, a plasticizer is preferably incorporated and this may compose up to about 50%, and more commonly up to about 25%, by weight of the elastomer. The higher levels of plasticizer are satisfactory if the diol is substantially free of carbonyl groups and peroxides, as described above. Smaller amounts may sometimes be used however and in controlled amounts a plasticizer usually increases the ultimate tensile strength of the composition. For instance a propellant containing about 5% of a suitable plasticizer based on the weight of the elastomer may have double the ultimate tensile strength of a composition containing no plasticizer. Since the propellants are usually required to have adequate physical properties at low temperatures, plasticizers known to impart good low temperature properties are usually employed and among these may be mentioned di(2-ethylhexyl) azelate, isodecyl pelargonate and di(2-ethylhexyl) sebacate. As noted above the plasticizer is preferably incorporated into the binder at a prepolymer stage.

For certain applications it is desirable to adjust the elongation at maximum stress of the propellant and for this purpose additions of minor amounts of surfactants have been used. Such substances are generally added at levels of 1 to 2% based on the elastomer to obtain the desired results. Effective agents are polyethylene ether diol diesters of monobasic fatty acids wherein the side chain is non-crystallizable and has 8 to 12 carbon atoms and wherein the diol is of molecular weight 200 to 600. Among the preferred agents may be mentioned polyethylene ether diol 400 dilaurate, i.e. the dilauric acid ester of a polyethylene ether glycol of molecular weight 400.

Other minor constituents which are commonly utilized in propellants may also be present and these include antioxidants, burning rate modifiers, high energy fuels and pulverized metals.

As an example of a suitable antioxidant may be mentioned phenyl-$\beta$-naphthylamine which may be used at levels up to about 3% by weight of the elastomer and preferably at a level of about 1%.

Burning rate modifiers include catalysts of the conventional gas catalyst type based on copper, nickel or chromium oxides, singly or in admixture, and may be employed at levels of about 1 to 2%. Furthermore silicon-based copolymerized polyols, and plasticizers are effective as burning rate modifiers. In particular a polyol formed by transesterification from triethylene glycol and the siloxane such as

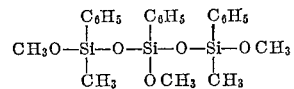

is effective as the burning rate catalyst. The modifiers also include burning rate depressants based on inorganic salts or organic dyes, volatilizable at the propellant surface temperature of 400 to 1200° C. As an inorganic salt depressant may be mentioned lithium fluoride and among the organic dyes may be mentioned copper phthalocyanine.

High energy fuels of the type based on organic boron compounds are still generally under development but may be added in minor amounts to modify the properties of the propellant.

Pulverized metals of certain types may be substituted at appropriate levels for the oxidant by a weight for weight basis. Suitable metals include aluminum, magnesium and particularly alloys of these two metals. Preferred pulverized metal fuels are the magnesium aluminum alloys having a content of 5 to 15 parts by weight of magnesium and 95 to 85 parts by weight of aluminum. Such alloys can readily be produced in the form of reactive blown powders having a particle size in the range 10 to 100 microns. Virgin aluminum however must be below 10 microns in diameter or must be in the form of very fine flake material. However flake and fine powder reduce propellant castability and cannot therefore be employed at levels over about 2 to 5 parts by weight per 100 parts of oxidant, whereas the preferred blown powders of magnesium aluminum alloys may be used in amounts up to 25 parts by weight per 100 of oxidant. Unstable burning of the propellant is suppressed by the use of powders wherein 60% by weight of the powder is of a particle size of less than 50 microns, such a fuel being used at levels of 4 to 10 parts by weight per 100.

The following examples further illustrate the present invention:

Example 1

Polypropylene ether glycol of molecular weight 2000, polyoxypropylene 1,2,6-hexanetriol and di(2-ethylhexyl) azelate are dried to a moisture content less than 0.03 percent by weight. 2,4-tolylene diisocyanate of 99 percent purity and hydrolysable chlorine content adjusted to be in the range 0.01–0.02 percent by weight is used. Ninety grams of polyoxypropylene 1,2,6-hexanetriol (molecular weight 1440) is prereacted with 87.3 g. of 2,4-tolylene diisocyanate in 45.8 g. of plasticizer to form an isocyanate-rich prepolymer. A catalyst such as ferric acetyl acetonate is blended into the diol (739 g.) at a level selected on its activity but which is normally 0.6 g. per 1000 g. of propellant together with 9.6 g. of the phenyl-$\beta$-naphthylamine. A weight of 2915 g. of ammonium perchlorate is dried to a surface moisture content of less than 0.03 percent by weight and is mixed with 739 g. of the diol specified in a ribbon blender for 15 minutes at 25–30° C. and a vacuum of 2 mm. of mercury. After this time the prepolymer is added and mixing continued for a further 30 minutes under vacuum. The mix is then cast under vacuum into suitably prepared rocket engines and cured for 48 hours at 70° C. or at a temperature as low as 45° C. for an appropriately longer period. Such a propellant has a brittle point of −56° C. and at 25° C. has a maximum tensile stress of 93 p.s.i. at an elongation of not less than 20 percent and an ultimate elongation of 100 percent. The isocyanate used should be in excess by an amount of 3–7 percent and is adjusted according to the exact molecular weight of the other reactants.

Example 2

The polypropylene oxide adduct of polytetrahydrofuran (molecular weight 1000) with a final molecular weight of 2000, polyoxypropylene 1,2,6-hexanetriol (molecular weight 1500) and di(2-ethylhexyl)azelate are dried to a moisture content of 0.03 percent by weight. A weight of 69.8 g. 2,4-tolylene diisocyanate of controlled chlorine content is prereacted with 72 g. of the triol in the presence of 139.4 g. of di(2-ethylhexyl) azelate at 60° C. A weight of 555 g. of the diol are preblended with 2 g. ferric acetyl acetonate and 8.36 g. phenyl-$\beta$-naphthylamine. A weight of 2533 g. of ammonium perchlorate is taken and mixed with the diol in a ribbon blender for 15 minutes at a temperature of 25–30° C. and a vacuum of 2 mm. mercury. After this period the prepolymer is added and mixing continues for 30 minutes under vacuum. Casting of the mix is then carried out under vacuum. Such a composite propellant after curing has a brittle point of −72° C. and at 25° C. has a maximum tensile stress of 96 p.s.i. at an elongation of 42 percent and an ultimate elongation of 100 percent. This propellant is flexible down to −72° C. whilst still maintaining the same physical properties as that given in the first example.

Example 3

A propellant showing increased stability to unstable modes of burning is made by the process outlined in Example 1 using 5 percent by weight magnesium/aluminum alloy (5.75/94.25) of the preferred particle size distribution (i.e. a blown powder having 60% by weight of a particle size of less than 50 microns) as an additive which is preblended with the ammonium perchlorate. Its composition is as follows:

Ingredient:

| | |
|---|---|
| 1,2,6-tris ($\omega$-hydroxypolyoxypropylene) hexane (mol wt. 1440) ____parts by weight__ | 9.0 |
| 2,4-tolylene diisocyanate _____do____ | 8.73 |
| Di-2-ethylhexylazelate _____do____ | 4.58 |
| Polyoxypropylene glycol (mol. wt. 1970) _____do____ | 73.9 |
| Phenyl-$\beta$-naphthylamine _____do____ | 1.92 |
| Ferric acetylacetonate _____percent__ | .06 |
| Ammonium perchlorate ___parts by weight__ | 274.7 |
| Aluminum alloy powder _____do____ | 19.6 |

This propellant has been demonstrated to be less prone to unstable burning at low temperatures. Its specific impulse is in the range of 210 to 220 lb. sec./lb. in typical rocket engines and it has a density of about 1.6 grams per cc.

Example 4

A propellant of enhanced performance is made by the process outlined in Example 1 using 15 percent by weight of magnesium/aluminum alloy (5.75/94.25) of the preferred particle size distribution (i.e. a blown powder having 60% by weight of a particle size of less than 50 microns) which is preblended with the ammonium perchlorate. Its composition is as follows:

Ingredient:

| | |
|---|---|
| 1,2,6-tris ($\omega$-hydroxypolyoxypropylene) hexane (mol wt. 1440) ____parts by weight__ | 9.0 |
| 2,4-tolylene diisocyanate _____do____ | 8.73 |
| Di-2-ethylhexyl azelate _____do____ | 4.58 |
| Polyoxypropylene glycol (mol. wt. 1970) _____do____ | 73.9 |
| Phenyl-$\beta$-naphthylamine _____do____ | 1.92 |
| Ferric acetylacetonate _____percent__ | .06 |
| Ammonium perchlorate __parts by weight__ | 235.45 |
| Aluminum alloy powder _____do____ | 58.86 |

This propellant cured in 72 hours at 50° C.

Example 5

The improvement in propellant binder owing from the limits put on impurities enables higher levels of plasticizer to be used in order to further improve the low temperature physical properties. A typical propellant is as follows:

Ingredient:

| | |
|---|---|
| 1,2,6-tris ($\omega$-hydroxypolyoxypropylene) hexane (mol wt. 1440) ____parts by weight__ | 9.0 |
| 2,4-tolylene diisocyanate _____do____ | 8.73 |
| Di-2-ethylhexyl azelate _____do____ | 183.3 |
| Polyoxypropylene glycol (mol wt. 1970)[1] _____do____ | 734.0 |
| Phenyl-$\beta$-naphthylamine _____do____ | 9.6 |
| Ferric acetylacetonate _____percent__ | .06 |
| Ammonium perchlorate ___parts by weight__ | 3105 |
| Aluminum alloy powder _____do____ | 221.8 |

[1] Saponification number ≯0.3; peroxide content ≯0.001 milli-equivalent/gram.

This propellant after curing for 72 hours at 50° C. possessed a tensile strength of 90 p.s.i. at an elongation of 27 percent and after aging for 500 hours at 60° C. had suffered no deterioration in its tensile strength or elongation. The tensile strength and elongations at +60° C. and −40° C. after 500 hours being 66 p.s.i. and 19 percent and 244 p.s.i. and 30 percent respectively.

What I claim as my invention is:

1. A composite propellant composition consisting essentially of an inorganic oxidant, and, as a fuel and binder therefor, an elastomeric polyurethane, said polyurethane being the reaction product of a polyalkylene ether diol having a molecular weight of from about 1500 to about 3000, and a stoichiometrical excess of a diisocyanate which is fluid at ambient temperatures selected from the class consisting of aliphatic diisocyanates and aromatic diisocyanates, cross linked with a triol having a molecular weight of about 500 to about 3000 which is miscible with said polyalkylene ether diol under ambient conditions, the triol being an alkylene oxide adduct of a material selected from the group consisting of aliphatic triols and aliphatic amino alcohols, said aliphatic triols and said aliphatic amino alcohols each having molecular weight up to about 200.

2. A composite propellant composition as defined in claim 1 wherein the diol is substantially free from carbonyl groups and peroxides, having a saponification number not more than 0.3 and a peroxide content of not more than 0.001 milli-equivalent per gram.

3. A composite propellant composition as defined in claim 2 wherein the triol has a molecular weight between about 1000 and 2400 and is a polyalkylene oxide adduct of a low molecular weight aliphatic compound having at least 3 and not more than 4 reactive hydrogens, and selected from the group consisting of triols and amino alcohols.

4. A composite propellant composition as defined in claim 3 wherein the triol is an adduct of 1,2,6-hexanetriol with an alkylene oxide of not more than 3 carbon atoms.

5. A composite propellant composition as defined in claim 2 wherein the diol is a tetrahydrofuran-propylene oxide copolymer.

6. A composite propellant composition as defined in claim 2 wherein the diol is a blend of polypropylene ether diol with polytetrahydrofuran.

7. A composite propellant composition as defined in claim 3 wherein the inorganic oxidant is selected from the group consisting of ammonium perchlorate and lithium perchlorate.

8. A composite propellant composition as defined in claim 7 wherein part of the perchlorate is replaced by a pulverized metal fuel.

9. A composite propellant composition as defined in claim 8 wherein the pulverized metal fuel is a blown powder of a magnesium-aluminum alloy having a content of 5 to 15 parts by weight magnesium and 95 to 85 parts by weight aluminum.

10. A composite propellant composition as defined in claim 9 wherein 60% of the powder is of a particle size less than 50 microns.

11. A composite propellant composition as defined in claim 2 wherein the binder contains a plasticizer.

12. A composite propellant composition as defined in claim 2 containing, as a burning rate catalyst, a polyol formed by transesterification from triethylene glycol and the siloxane

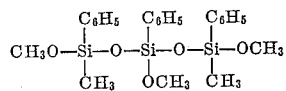

13. A composite propellant composition as defined in claim 2 wherein the binder contains a polyethylene ether diol diester of a monobasic fatty acid wherein the side chain is non-crystallizable and has 8 to 12 carbon atoms and wherein the polyethylene ether diol is of molecular weight 200 to 600.

References Cited

UNITED STATES PATENTS

| 2,928,866 | 3/1960 | Vanneman et al. | 52—0.5 X |
| 2,933,491 | 4/1960 | Klager | 52—0.5 X |
| 2,692,874 | 10/1954 | Langerak | 260—77.5 |

OTHER REFERENCES

Zaehringer (I) "Solid Propellant Rockets—Second Stage" American Rocket Co., Box 1112, Wyandotte, Mich., 1958, pp. 203–219.

Zaehringer (II) Missiles and Rockets, vol. 5, No. 2, Jan. 12, 1959, pp. 16, 17.

BENJAMIN R. PADGETT, *Primary Examiner.*

ROGER L. CAMPBELL, *Examiner.*